US011228083B2

(12) United States Patent
Stehlik

(10) Patent No.: US 11,228,083 B2
(45) Date of Patent: Jan. 18, 2022

(54) QUICK ACTION CONNECTOR

(71) Applicant: Scott Stehlik, Litchfield Park, AZ (US)

(72) Inventor: Scott Stehlik, Litchfield Park, AZ (US)

( * ) Notice: Subject to any disclaimer, the term of this patent is extended or adjusted under 35 U.S.C. 154(b) by 17 days.

(21) Appl. No.: 16/844,751

(22) Filed: Apr. 9, 2020

(65) Prior Publication Data

US 2020/0328494 A1 Oct. 15, 2020

Related U.S. Application Data

(60) Provisional application No. 62/833,514, filed on Apr. 12, 2019.

(51) Int. Cl.

*H01Q 1/08* (2006.01)
*H01Q 1/20* (2006.01)
*H01Q 1/32* (2006.01)
*F16L 37/00* (2006.01)

(52) U.S. Cl.

CPC ............... *H01Q 1/20* (2013.01); *H01Q 1/085* (2013.01); *H01Q 1/3275* (2013.01)

(58) Field of Classification Search

CPC ............ H01Q 1/085; H01Q 1/08; H01Q 1/20; H01Q 1/32; H01Q 1/3275; F16L 17/00; F16L 19/00; F16L 37/00; F16B 17/00; F16B 7/10; F16B 39/02; F16B 39/08

See application file for complete search history.

(56) References Cited

U.S. PATENT DOCUMENTS

| | | | | | |
|---|---|---|---|---|---|
| 4,190,839 | A * | 2/1980 | Liautaud | H01Q 1/088 | 343/715 |
| 4,242,684 | A * | 12/1980 | Wolverton | H01Q 1/088 | 343/715 |
| 4,364,051 | A * | 12/1982 | Yamashita | H01Q 1/088 | 343/715 |
| 5,607,251 | A * | 3/1997 | Rafn | E02F 3/3609 | 37/406 |
| 8,240,718 | B2 * | 8/2012 | Morton | F16L 23/036 | 285/312 |
| 11,002,394 | B2 * | 5/2021 | Zimmerman | F16L 17/035 | |

* cited by examiner

*Primary Examiner* — Tho G Phan

(57) ABSTRACT

A quick action connector comprises a quick action base and a cam lock, wherein: the quick action base comprises a retaining sleeve, a base body, at least two rivets, a disk, and a biasing spring; and the cam lock comprises a cam arm having a tapered end with rivet slots, wherein the rivets extend from an inner diameter of the retaining sleeve, the spring biases the disk the rivets when the cam arm is not inserted into the base and biases the disk against the tapered end of the cam arm when the cam lock is inserted in the base and rotated such that the rivet slots engage the rivets.

14 Claims, 5 Drawing Sheets

QUICK ACTION CONNECTOR

PRIORITY CLAIM

This Applicant claims priority under 35 U.S.C. § 119(e) from U.S. Provisional Application 62/833,514, filed Apr. 10, 2019, the contents of which are incorporated herein in their entirety.

TECHNICAL FIELD

The present invention relates to a quick-release connector for detachably connecting a first object (e.g., a light whip or an antenna whip) to a second object (e.g., an off-road sport utility vehicle).

BACKGROUND OF THE INVENTION

Off-road vehicle operators must often load their off-road vehicles into trailers for transportation over public roadways. Any long moment arm attachments to such off-road vehicles, such as increasingly popular light whips and antenna whips, are vulnerable to breakage during transportation. Accordingly, it would be desirable to be able to remove such attachments during loading and transportation, and quickly re-attach the attachment at its destination. It would be desirable that such attachment and detachment be achievable without the use of tools. It would also be desirable that the connector be durable enough to survive high flexional stresses caused by such factors as wind acting on the moment arm of the attachment. Prior to developing the invention described herein, the inventor was unable to find a single device that provided the desired ease of connection and disconnection, without tools, and durability under flexional stress.

DESCRIPTION OF THE DRAWINGS

The features and advantages of the present invention, which include, but are not necessarily limited to ease of connection and detachment, without tools, and durability under flexional stress, will become apparent from a consideration of following detailed description presented in connection with the accompanying drawings in which.

The figures are for illustrative purposes only and are not to scale. Additional embodiments within the scope and spirit of the invention may be envisioned in light of the figures and the following description.

DETAILED DESCRIPTION OF THE INVENTION

The inventor is experienced in developing and manufacturing accessory devices for off-road vehicles. One such accessory device is a light-whip: a long, strong and flexible member having one or more lights, disposed thereon. Such accessories may be attached to the back of the off-road vehicle, and are desirable for, among other things, their ornamental characteristics. To attract the greatest attention, owners like their light whips to be long, in order to bear a large number of lights. The longer the light whip, and the greater the number of lights, the heavier it is and the greater stress it absorbs from the motion of the vehicle and wind impinging all along its length. Moreover, because off-road vehicles are generally not street legal, their owners also want to be able to quickly attach and detach their accessories, without the use of tools, so they can be quickly loaded onto trailers, thereby maximizing the amount of time their owners have to enjoy their sport. The inventor found that connectors that were resilient enough to withstand high flexional forces were inconvenient to connect and disconnect, and required the use of tools, which are easily mislaid or lost; those connectors that were easy to connect and disconnect were too weak to withstand the aforementioned flexional forces.

Figure 9:
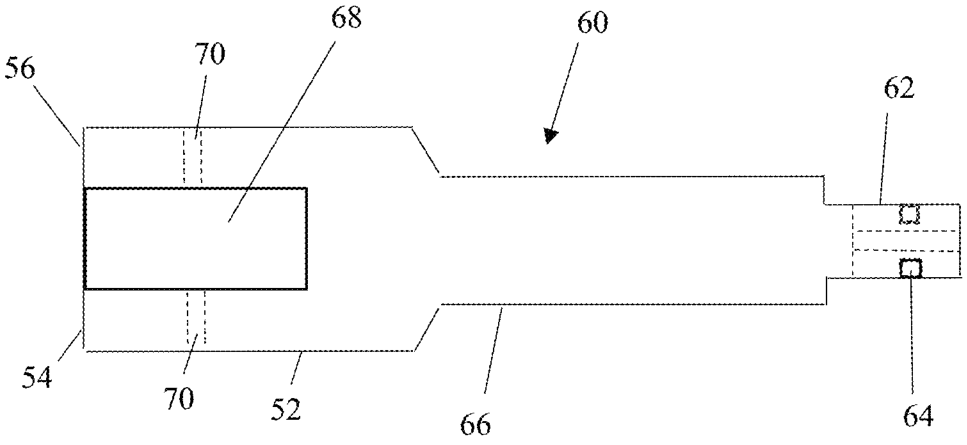
FIG. 9 is a side cutaway view, rotated 90° from FIG. 8, of a cam lock of a quick action connector of the invention.
Figure 10:
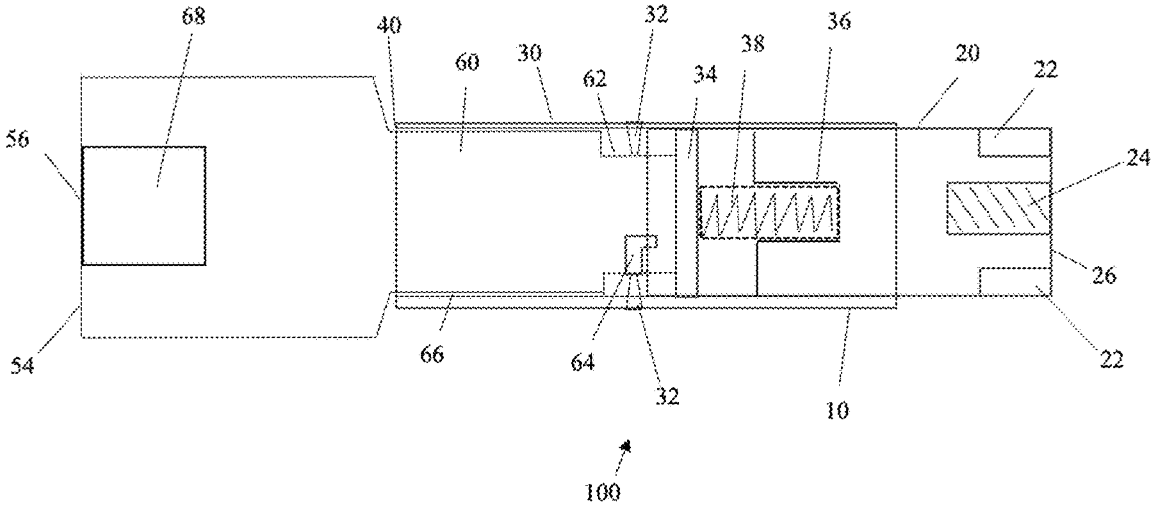
FIG. 10 is a side cutaway view of a quick action connector of the invention.
Figure 11:
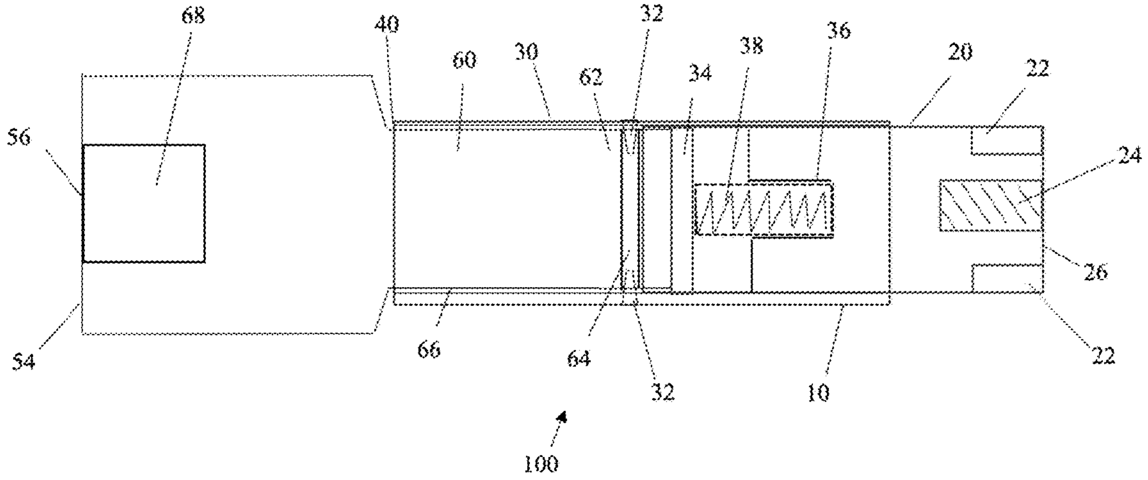
FIG. 11 is a side cutaway view, rotated 90° from FIG. 10, of a quick action connector of the invention.

The inventor has conceived and reduced to practice a quick action connector having the features of easy connection and disconnection, without tools, and resilience and durability under high flexional forces associated with vehicle motion and wind acting on long moment arm accessories, such as light whips and antenna whips. Two views of such a quick action connector (100) can be seen in FIGS. 10 and 11, which show orthogonal cutaway views of a quick action connector (100) embodying these features. There are two essential parts of the invention: a quick action base (10) (see FIGS. 1-6), which may be conveniently adapted to attach to a vehicle or other moveable object, and a cam-lock (60) (see FIGS. 7-9), which may be conveniently adapted to be attached to an accessory or other flexionally-stressed member. As can be seen in FIGS. 10 and 11, the quick action base (10) receives a cam arm (66) of a cam lock (60) within a void space (46) of the quick action base. The cam arm (66) has a tapered end (62), which is narrow in one dimension and possesses rivet slots (64) cut into both sides of the tapered end (62). The cam arm (66) is inserted into the void space (46) of the quick action base (10) at such an angle that the tapered end (62) fits between two rivets (32) inserted and cemented within the quick action base (10). Then the cam lock (60) is pushed toward the base (10) to depress the disk (34), which is biased toward the rivets (32) by a spring (38) disposed within a depression (36) in the base body (20). The cam lock (60) is then rotated 90° (FIG. 11) so that the rivet slots (64) engages the rivets (32). The cam lock (60) is locked into place by the bias provided by the spring (38) which prevents the rivet slots (64) from disengaging from the rivets (32).

Figure 1:
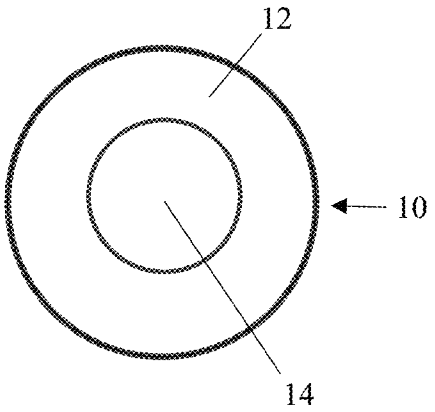
FIG. 1 is bottom view of a quick action base of the invention. The aperture in the middle of the base may be threaded to receive a male threaded member, such as a bolt.
Figure 2:
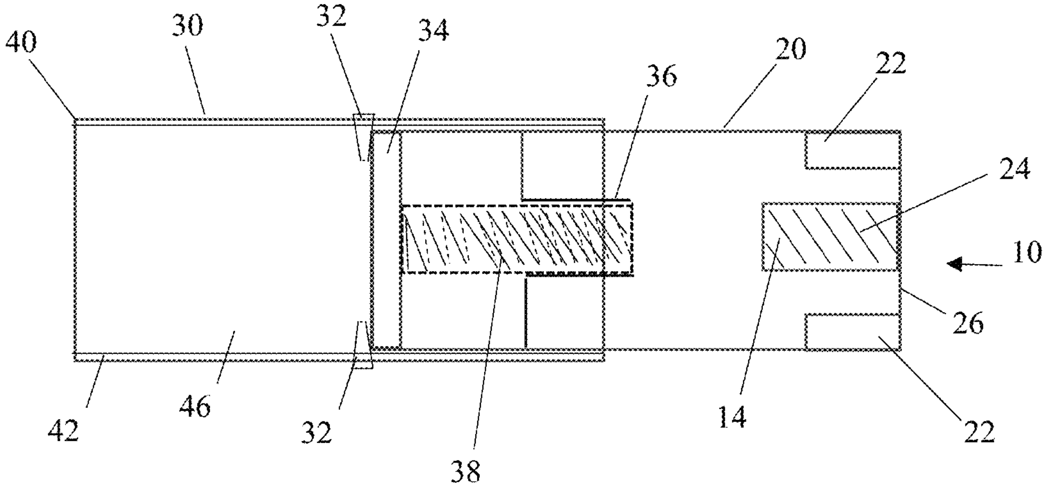
FIG. 2 is a side cutaway view of the quick action base.
Figure 3:
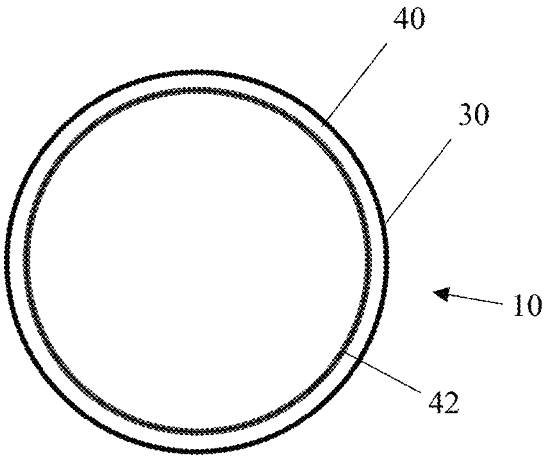
FIG. 3 is a top-down view of the quick action base.
Figure 4:
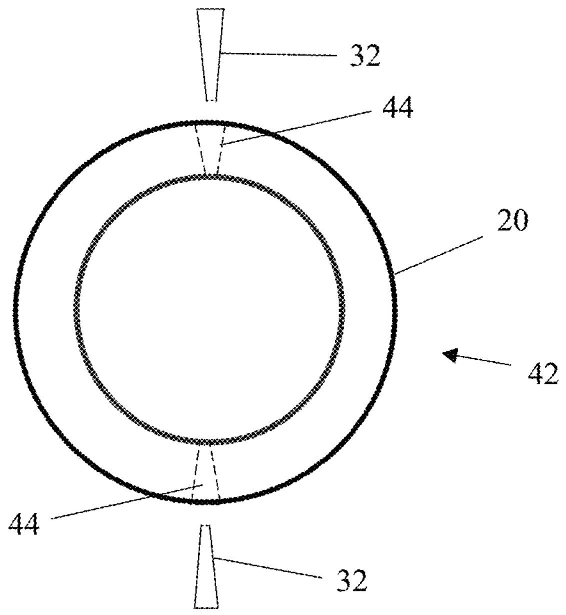
FIG. 4 is an exploded view of an inner core of the quick base.
Figure 5:
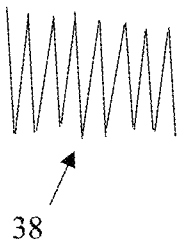
FIG. 5 is a side view of a spring for use in the quick action base.
Figure 6:
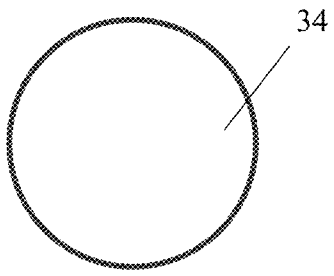
FIG. 6 is a view of the disk shown in FIG. 2.

The quick action base (10) is shown in detail in FIG. 1-6. FIG. 1 shows a view from the bottom (12) of the quick action base (10). The aperture (14) in the quick action base (10) may be threaded or otherwise adapted to be semi-permanently attached (e.g., with the aid of tools) to a vehicle or other object. FIG. 2 shows a cutaway side view of the base (10), comprising a base body (20) and retaining sleeve (30). The base body (20) may be machined from a single piece of metal, such as steel. It may have wrench slots (22), which facilitate turning the base body (20) onto a threaded member attached to a vehicle using threads (24). As mentioned before, the base body (20) also has a depression (36), which holds a spring (38). The spring provides bias in the direction of rivets (32), whereby the disk (34) is prevented from moving past the rivets (32) when the cam lock (60) is removed, and prevents the cam lock from detaching from the rivets (32) when the cam lock (60) is in place. A side view of the spring (38) is visible in FIG. 5. A top view of the disk (34) is visible in FIG. 6.

The retaining sleeve (30) serves two functions. First, it holds in place the rivets (32). Second, it forms the void space (46) into which the cam arm (66) of the cam lock (60) is inserted. The sleeve (30) is formed of two tight-fitting coaxial sleeve members—an inner sleeve member (42) and an outer sleeve member (40). As the connector is desirably operated by hand, the outer sleeve member (40) is a cylinder which may be knurled or otherwise textured to improve hand grip. The inner sleeve member has two rivet vias (44) to receive the two rivets (32), which may be cemented in place. (Other means of attachment may be used, such as threading, soldering, welding, etc.) Once the rivets (32) are inserted into the vias (44), the outer sleeve member (40) slides over the inner sleeve member (40) to complete the outer sleeve (30). The outer sleeve member (40) has an inner dimension, and the inner sleeve member (42) has an outer dimension, such that the two members fit snugly enough together that once the outer sleeve member (40) is placed around the inner sleeve member (42) the two do not separate from one another. The outer sleeve (30) is then placed on the base body (20) to complete the quick action base (10).

Figure 7:
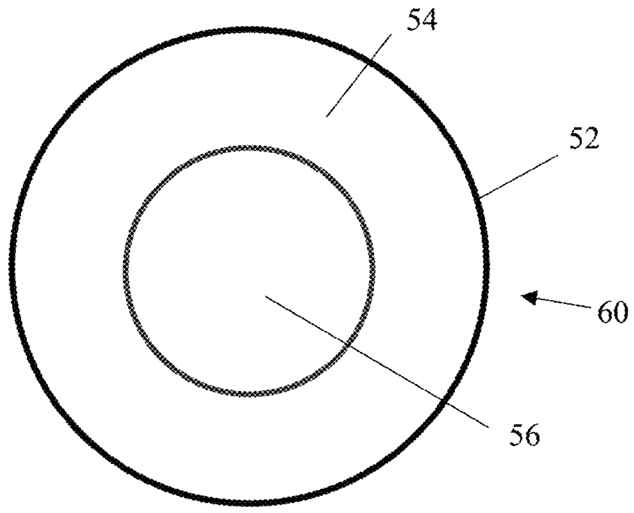
FIG. 7 is a top view of a cam lock of a quick action connector of the invention. The aperture in the cam lock is adapted to receive an end or part of a first object to be reversibly attached to the second object.
Figure 8:
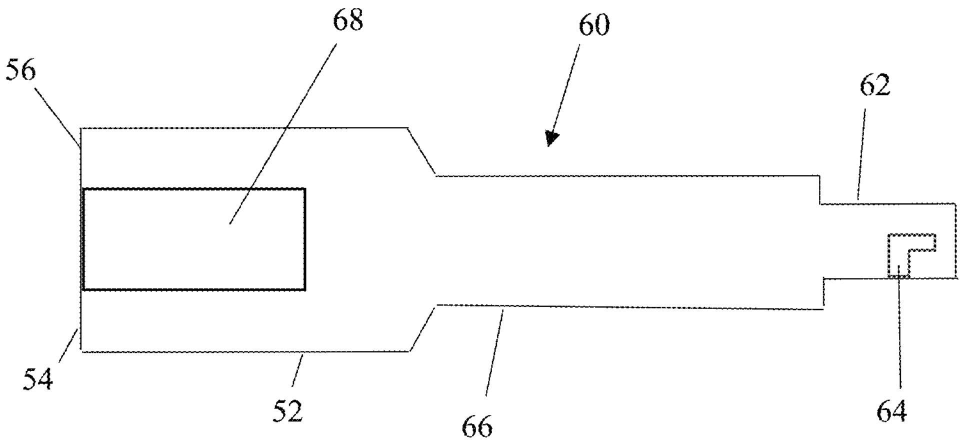
FIG. 8 is a side cutaway view of a cam lock of a quick action connector of the invention.

FIG. 7 shows a top view of a cam lock (60). The cam lock (60) has a cam body (52) having a cam top (54) which is a cylindrical member defining a cavity mouth (56). FIG. 8-9 are orthogonal cutaway views of the cam lock (60) showing the cam body (52), the cam top (54) and the cavity mouth (56), the latter of which opens into the cam cavity (68). The cam cavity is adapted to receive an end of an accessory, such as a light whip, to provide a permanent or semi-permanent attachment. While the accessory may be attached to the cam lock in any convenient manner, in some cases the accessory may be a whip of some material such as fiberglass or PVC, which may be cemented into place in the cam cavity (68) by first placing a sufficient amount of epoxy cement in the cavity (68) and then sliding an end of the accessory into place within the cam cavity (68). An epoxy relief hole (70) may be provided through the cam body (52) to allow egress of excess epoxy cement and air when the end of the accessory is introduced into the cam cavity (68).

In addition to being easy to operate, the connector (100) is durable under high flexional stress (i.e., bending or flexing the ends toward one another (arrows, FIG. 10) due to wind and inertial forces working on the moment arm of the accessory (e.g., light whip or antenna whip). In some embodiments, this is achieved by ensuring that the cam lock arm (66) fits snuggly within the void space (46) of the quick action base (10) to minimize wiggling of the cam lock arm (66) within the void space (46) of the quick action base. Further strength may be added by ensuring that the end of the accessory (such as a fiberglass whip) fits directly into, and is optionally cemented into, the cam cavity (68) of the cam lock body (66). Having the end of the accessory directly (or snugly) into the cam cavity (68), especially having the accessory cemented directly and snugly into the cam cavity (68) provides additional strength as the accessory flexes along its length and puts flexional stress on the connector (100).

While particular embodiments are described for attaching an accessory to the cam lock (60) and a vehicle to the base (10), the inventor has conceived that the cam lock (60) and base (10) may be reversed without affecting the essential features of the invention. Additionally, while specific materials have been mentioned herein, other materials may be used within the spirit and scope of the invention.

What is claimed is:

1. A quick action connector (100), comprising a quick action base (10) and a cam lock (60), wherein:

a) the quick action base (10) comprises a retaining sleeve (30), a base body (20), at least two rivets (32), a disk (34), a spring (38); and b) the cam lock (60) comprising a cam arm (66) having a tapered end (62) with rivet slots (64), c) wherein the rivets (32) extend from an inner diameter of the retaining sleeve (30), the spring (38) biases the disk (34) against the rivets (32) when the cam arm (66) is not inserted into the base (10) and biases the disk against the tapered end (62) of the cam arm (66) when the cam lock (60) is inserted in the base (10) and rotated such that the rivet slots (64) engage the rivets (60).

2. The quick action connector (100) of claim 1, wherein the retaining sleeve (30) has an outer surface that is textured to provide a hand grip.

3. The quick action connector (100) of claim 1, wherein the retaining sleeve (30) of the quick action base (10) has an outer diameter and the cam lock (60) has a cam body (52) having an outer diameter, wherein the outer diameters of said retaining sleeve and said cam body (66) are approximately equivalent.

4. The quick action connector (100) of claim 3, wherein the approximate equivalence is selected from the group consisting of (1) less than 0.1% of the radius of either outer diameter; (2) less than 0.1 mm; or (3) less than 1/64".

5. The quick action connector (100) of claim 1, wherein the retaining sleeve (30) of the quick action base (10) has an inner diameter and the cam arm (66) of the cam lock (60) has an outer diameter, such that insertion of the cam arm (66) within the retaining sleeve (30) is snug.

6. The quick action connector of claim 5, wherein said snugness is measured as a gap between said inner and outer diameters, and said gap is selected from the group consisting of 1) less than 0.1% of the radius of either outer diameter; (2) less than 0.1 mm; or (3) less than 1/64".

7. The quick action connector (100) of claim 1, wherein the cam lock (60) has a cam cavity (68) adapted to have inserted directly into it an end of an accessory.

8. The quick action connector (100) of claim 7, wherein the accessory is an end of an accessory having a long moment arm.

9. The quick action connector (100) of claim 8, wherein the accessory is a light whip or an antenna whip.

10. The quick action connector (100) of claim 7, wherein the end of the accessory fits snugly within the cavity (68).

11. The quick action connector (100) of claim 10, wherein the end of the accessory is cemented snugly within the cavity (68).

12. An assembly comprising:

a) the quick action connector (100) of claim 1;

b) a vehicle c) a vehicle accessory;

d) wherein, the vehicle is attached permanently or semi-permanently to one of (1) the quick action base (10) or (2) the cam lock (60) of quick action connector (100), and the vehicle accessory is permanently attached to the other one of (1) the quick action base (10) or (2) the cam lock (60).

13. An assembly comprising:

a) the quick action connector (100) of claim 1; and b) a vehicle accessory;

wherein, the vehicle accessory is attached permanently or semi-permanently to one of (1) the quick action base (10) or (2) the cam lock (60) of quick action connector (100), and wherein the vehicle accessory is permanently attached to the other one of (1) the quick action base (10) or (2) the cam lock (60).

14. An assembly of claim 13, wherein the vehicle accessory is a light whip or an antenna whip and an end of the light whip or antenna whip is inserted snugly into, and cemented within, a cam cavity (68) of the cam lock (60).

* * * * *